US012573797B2

(12) United States Patent
Chen

(10) Patent No.: US 12,573,797 B2
(45) Date of Patent: Mar. 10, 2026

(54) ELECTRICAL CONNECTOR STRUCTURE

(71) Applicant: ELLAX CORPORATION, Taoyuan City (TW)

(72) Inventor: Yu-Jun Chen, Taoyuan City (TW)

(73) Assignee: ELLAX CORPORATION, Taoyuan City (TW)

( * ) Notice: Subject to any disclaimer, the term of this patent is extended or adjusted under 35 U.S.C. 154(b) by 310 days.

(21) Appl. No.: 18/233,869

(22) Filed: Aug. 14, 2023

(65) Prior Publication Data

US 2024/0113482 A1 Apr. 4, 2024

(30) Foreign Application Priority Data

Sep. 30, 2022 (TW) ................................ 111210733

(51) Int. Cl.
*H01R 13/71* (2006.01)
*H01R 13/506* (2006.01)
*H01R 13/717* (2006.01)

(52) U.S. Cl.
CPC ....... *H01R 13/7175* (2013.01); *H01R 13/506* (2013.01)

(58) Field of Classification Search
CPC ... H01R 13/7175; H01R 13/506; H01R 24/64
See application file for complete search history.

(56) References Cited

U.S. PATENT DOCUMENTS 4,491,376 A * 1/1985 Gladd .................. H01R 12/724 439/79
5,833,475 A * 11/1998 Mitra ..................... H01R 43/20 439/79
6,984,155 B1 * 1/2006 Liu ........................ H01R 24/64 439/490
7,044,779 B1 * 5/2006 Liu ........................ H01R 24/62 439/541.5
7,125,280 B1 * 10/2006 Lee ...................... H01R 13/717 439/490
8,998,650 B2 * 4/2015 Ku ......................... H01R 24/64 439/676
2003/0114027 A1 * 6/2003 Wurster ................. H01R 12/52 439/82

(Continued)

*Primary Examiner* — Truc T Nguyen
(74) *Attorney, Agent, or Firm* — HDLS IPR SERVICES; Chun-Ming Shih

(57) ABSTRACT

An electrical connector structure includes an insulating base, two light-emitting diodes, a top cover, and a back cover. A through slot extends through the insulating base. A top surface of the insulating base includes two engagement grooves and two notches. The engagement grooves communicate with the notches. Each light-emitting diode includes a light-emitting body and two conductive rods. The light-emitting bodies are embedded in the engagement grooves. Each conductive rod includes a horizontal section and a vertical section bent vertically. Each horizontal section is received in each notch. The top cover is connected to the insulating base to cover the two light-emitting diodes. The back cover is pivotally connected to the insulating base and covers another end of the through slot. The back cover includes through holes for insertion of the vertical sections, allowing for convenient assembly of the conductive rods into the insulating base through the notches.

10 Claims, 8 Drawing Sheets

(56) References Cited

U.S. PATENT DOCUMENTS

| | | | | |
|---|---|---|---|---|
| 2005/0009409 | A1* | 1/2005 | Chen | H01R 13/518<br>439/676 |
| 2006/0256556 | A1* | 11/2006 | Huang | H01R 13/7175<br>362/249.01 |
| 2009/0280678 | A1* | 11/2009 | Yang | G02B 6/4292<br>439/490 |
| 2011/0143584 | A1* | 6/2011 | Yang | G02B 6/4284<br>439/577 |
| 2012/0058687 | A1* | 3/2012 | Hsueh | H01R 24/86<br>439/660 |
| 2013/0171862 | A1* | 7/2013 | Chen | H01R 13/64<br>439/374 |
| 2013/0330972 | A1* | 12/2013 | Naito | H01R 13/40<br>29/882 |
| 2015/0357771 | A1* | 12/2015 | Chen | H01R 24/70<br>439/638 |

* cited by examiner

ELECTRICAL CONNECTOR STRUCTURE

BACKGROUND OF THE INVENTION

Technical Field

The present disclosure relates to a connector, in particular to an electrical connector structure designed for convenient assembly of light-emitting diodes.

Description of Related Art

Electrical connectors are widely used in various electronic products. With the development and popularity of different electronic devices, the demand for various types of electrical connectors has also increased. As a result, manufacturers continuously strive to improve electrical connectors to meet market demand by offering good quality, functionality, and reasonable prices. Among the numerous electrical connectors available in different specifications and functions, there is a type of connector used for transmitting network signals, such as RJ45, which is combined with light-emitting diodes (LEDs) to provide users with visual indications of a current signal status of the connector.

However, the light-emitting diodes of this type of electrical connector are generally arranged in an upper part of a plastic housing, so metal conductive rods of the light-emitting diodes need to be designed to be longer in length, and need to be bent by pressing to form an inverted L shape to facilitate soldering the metal conductive rods onto the circuit board, which leads to problems such as increased processing difficulty, cumbersome processing processes, and increased manufacturing costs and low production efficiency of the electrical connector. As a result, there is a need to improve the bending of the metal conductive rods of the light-emitting diodes.

In view of this, the inventor of the present disclosure has recognized the shortcomings of the related art mentioned above. With a dedicated focus on research and the application of relevant principles, the inventor has made every effort to address the aforementioned issues, thereby becoming the objective of improvement for the inventor.

SUMMARY OF THE INVENTION

A primary objective of the present disclosure is to facilitate convenient assembly of light-emitting diodes by enabling assembly personnel to insert conductive rods into an insulating base through notches.

Accordingly, the present disclosure provides an electrical connector structure, including: an insulating base provided with a through slot extending through the insulating base, wherein a top surface of the insulating base is provided with two engagement grooves and two notches arranged corresponding to the two engagement grooves respectively, the two engagement grooves are located at one end of the through slot, and the notches communicate with the engagement grooves respectively; two light-emitting diodes, wherein each of the light-emitting diodes includes a light-emitting body and two conductive rods connected to one side of the light-emitting body, the light-emitting bodies are embedded in the engagement grooves respectively, each of the conductive rods includes a horizontal section and a vertical section bent vertically from the horizontal section, and each of the horizontal sections is accommodated in one of the notches; at least one top cover connected to the insulating base corresponding to the two engagement grooves and the two notches to cover the two light-emitting diodes; and a back cover pivotally connected to the insulating base and covering another end of the through slot, wherein the back cover is provided with a plurality of through holes for insertion of the vertical sections.

According to one embodiment of the present disclosure, the insulating base includes two locking groove structures, and the top cover includes two locking hooks, each of the locking hooks is engaged with a corresponding one of the locking groove structures to secure the top cover to the insulating base.

According to one embodiment of the present disclosure, the insulating base includes two locking groove structures, the top cover includes two locking hooks, each of the locking hooks is engaged with a corresponding one of the locking groove structures to secure the top cover to the insulating base, each of the locking groove structures is substantially U-shaped and includes a resilient hook, and each of the locking hooks is accommodated in a corresponding one of the locking groove structures and engaged with a corresponding one of the resilient hooks.

According to one embodiment of the present disclosure, the insulating base includes two locking groove structures, the top cover includes two locking hooks, each of the locking hooks is engaged with a corresponding one of the locking groove structures to secure the top cover to the insulating base, each of the locking groove structures is disposed on one side of a corresponding one of the engagement grooves, and each of the locking groove structures is disposed between the two conductive rods of one of the light-emitting diodes.

According to one embodiment of the present disclosure, the insulating base includes two locking groove structures, the top cover includes two locking hooks, each of the locking hooks is engaged with a corresponding one of the locking groove structures to secure the top cover to the insulating base, each of the locking groove structures is disposed on one side of a corresponding one of the engagement grooves, each of the locking groove structures is disposed between the two conductive rods of one of the light-emitting diodes, the top cover further includes two compression structures arranged corresponding to the two locking groove structures, and each of the compression structures is substantially L-shaped and arranged around a corresponding one of the locking groove structures to abut against the conductive rods of a corresponding one of the light-emitting diodes.

According to one embodiment of the present disclosure, the top cover includes two compression structures, and each of the compression structures abuts against the conductive rods of one of the light-emitting diodes.

According to one embodiment of the present disclosure, the notches communicate with each other.

According to one embodiment of the present disclosure, a pivot shaft is extended from each of two sides of the back cover, a pivot hole is defined on each of two sides of the insulating base, and the pivot shafts are pivotally connected to the pivot holes respectively.

According to one embodiment of the present disclosure, the electrical connector structure further includes a signal transmission assembly, the signal transmission assembly includes a terminal base and a plurality of conductive terminals, the terminal base is disposed in the insulating base, and the conductive terminals are inserted through the terminal base.

According to one embodiment of the present disclosure, the electrical connector structure further includes a signal transmission assembly, the signal transmission assembly includes a terminal base and a plurality of conductive terminals, the terminal base is disposed in the insulating base, the conductive terminals are inserted through the terminal base, each of the conductive terminals includes a mating section and a soldering section bent from the mating section, the mating sections pass through the terminal base to be accommodated in the through slot, and the soldering sections are extended outward from the insulating base and arranged parallelly to the vertical sections.

The electrical connector structure of the present disclosure allows convenient assembly of the light-emitting diodes by inserting the conductive rods into the insulating base through the notches communicating with the engagement grooves. Furthermore, the conductive rods are fixed by the compression of the top cover, so the conductive rods may be kept fixed to ensure the bending effect when the back cover is pivoted to bend the conductive rods.

DETAILED DESCRIPTION

A detailed description and technical content of the present disclosure are described as follows with reference to the accompanying drawings, but the accompanying drawings are only for illustrative purposes and are not intended to limit the present disclosure.

Figure 1:
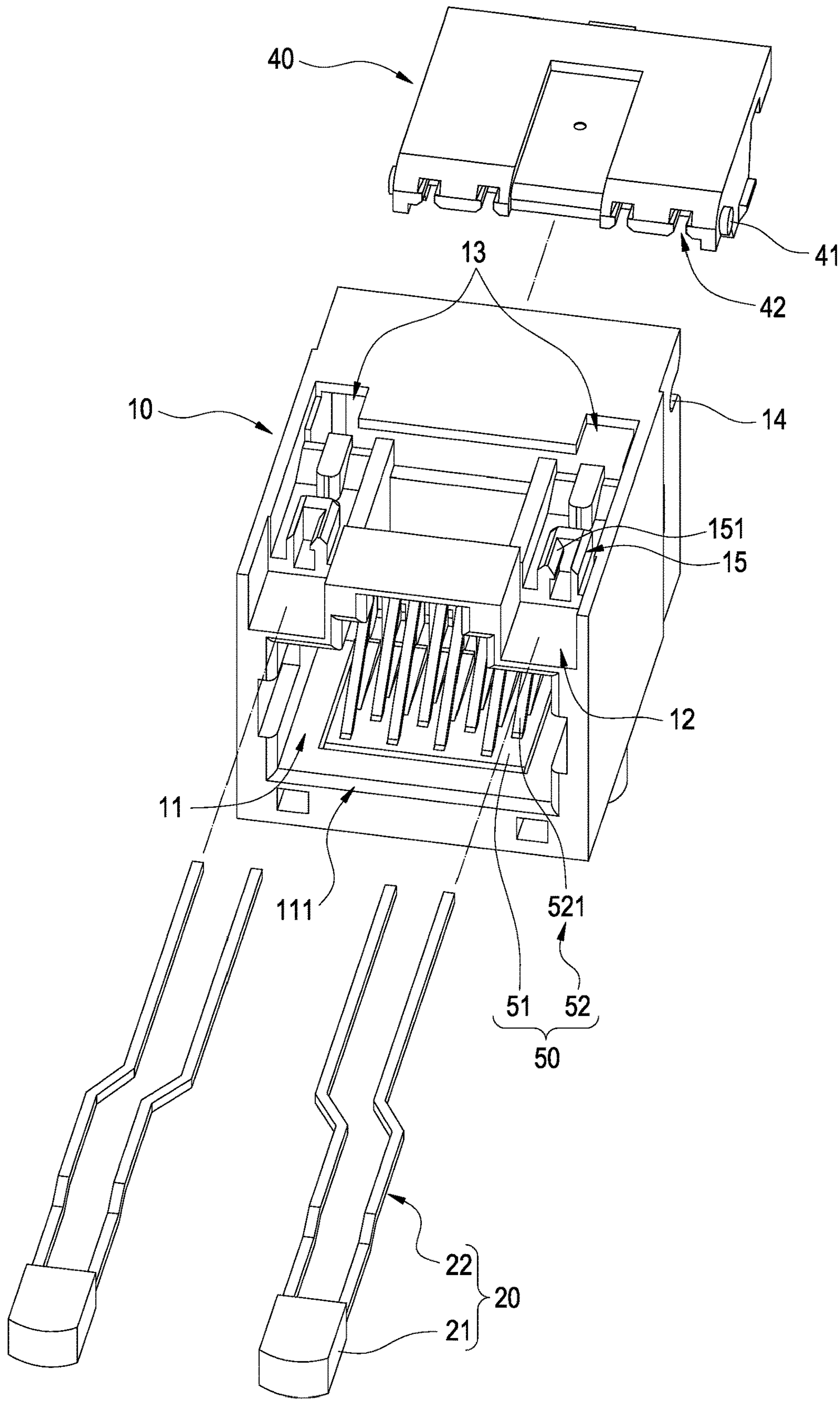
FIG. 1 is a perspective exploded view of the present disclosure before bending.
Figure 2:
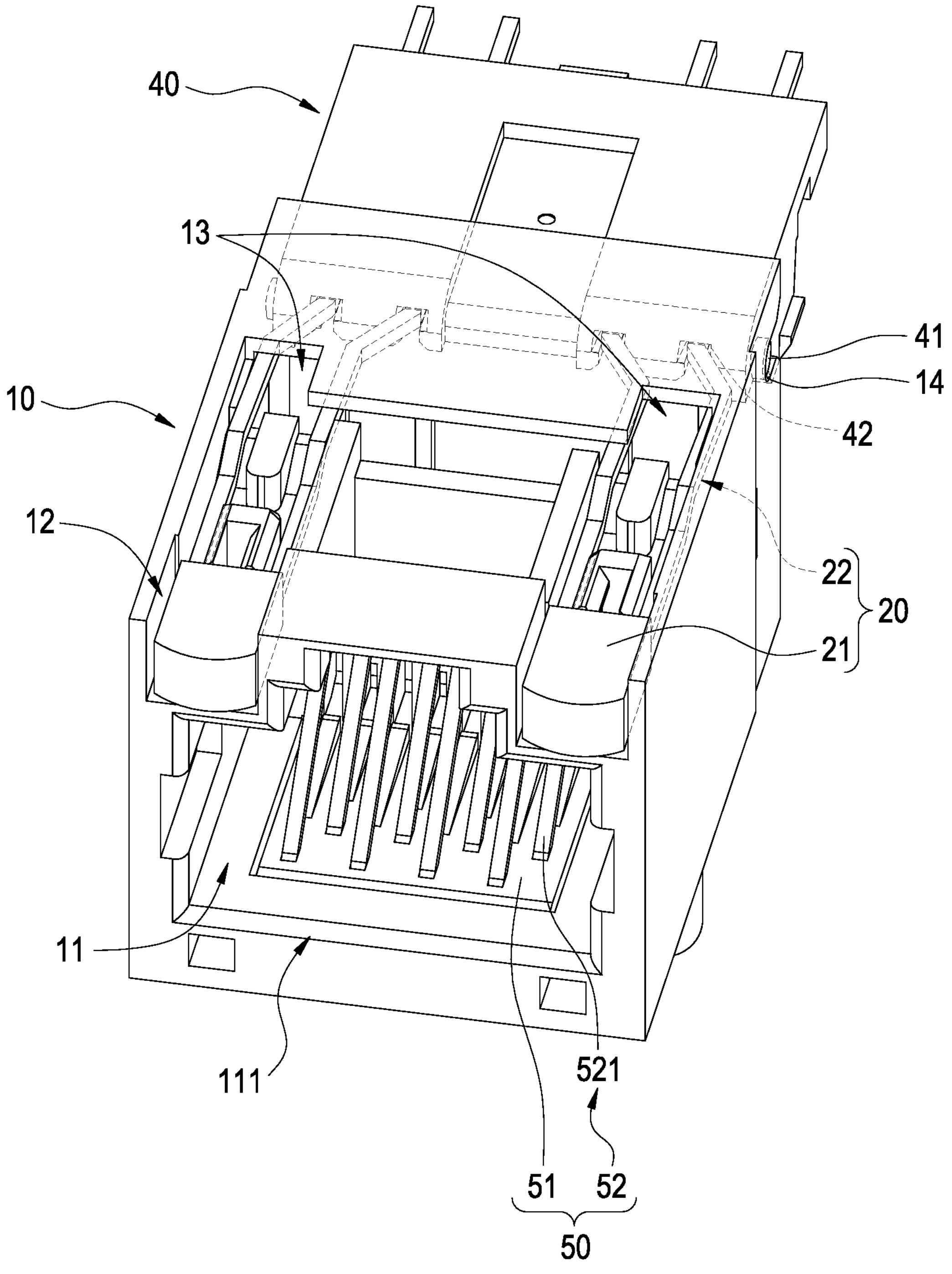
FIG. 2 is a perspective view of the present disclosure before bending.
Figure 3:
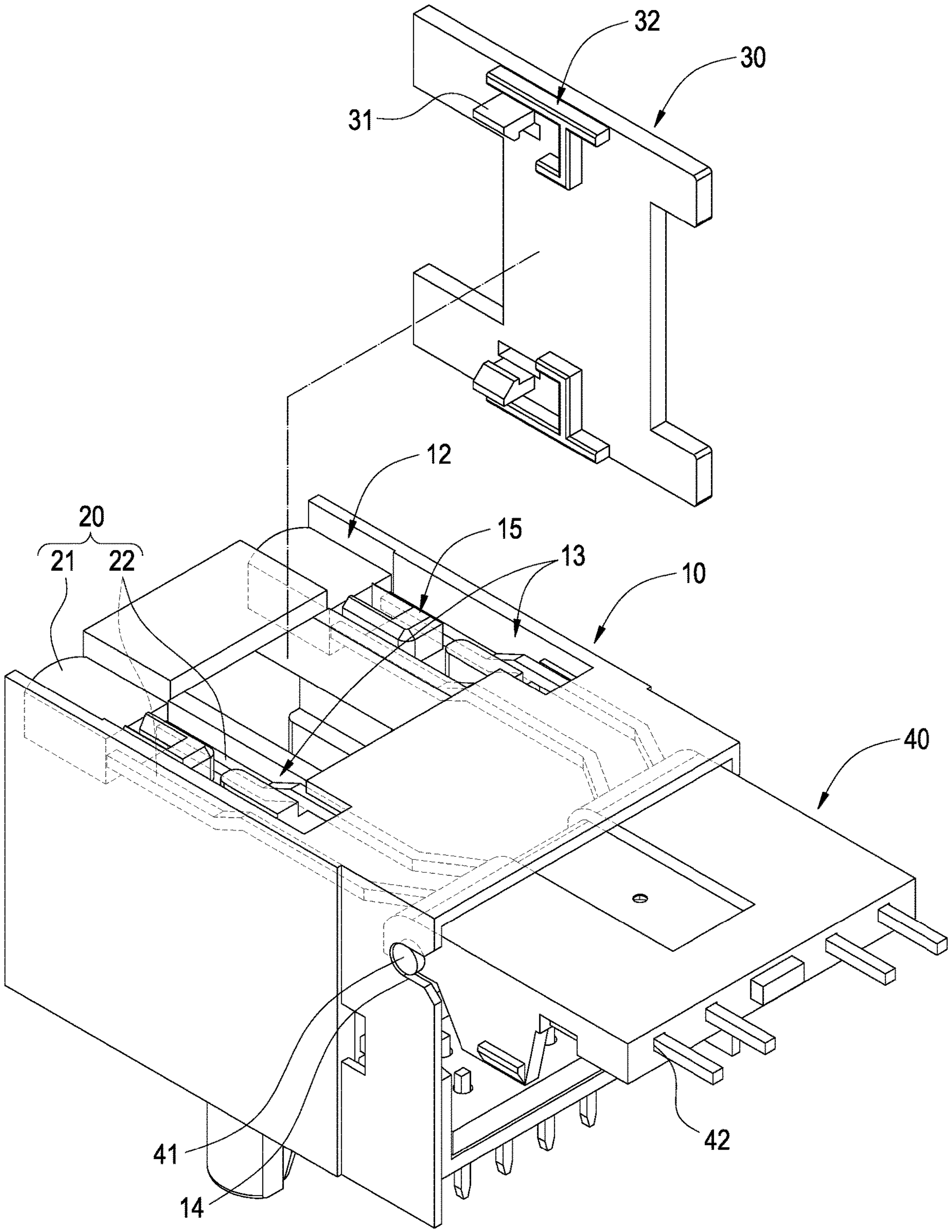
FIG. 3 is a perspective view of the present disclosure before bending from another viewing angle.
Figure 4:
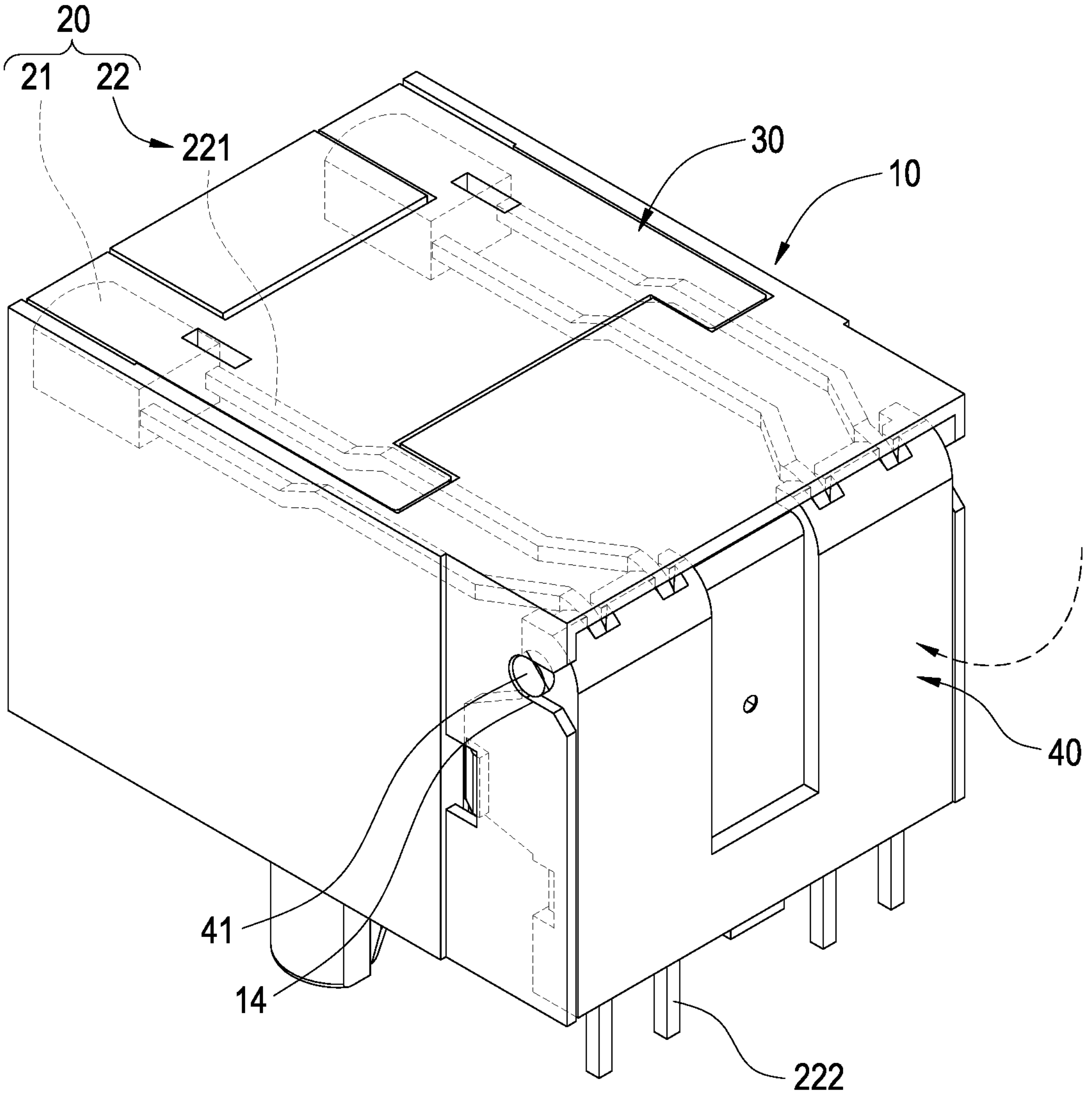
FIG. 4 is a perspective exploded view of the present disclosure after bending.
Figure 5:
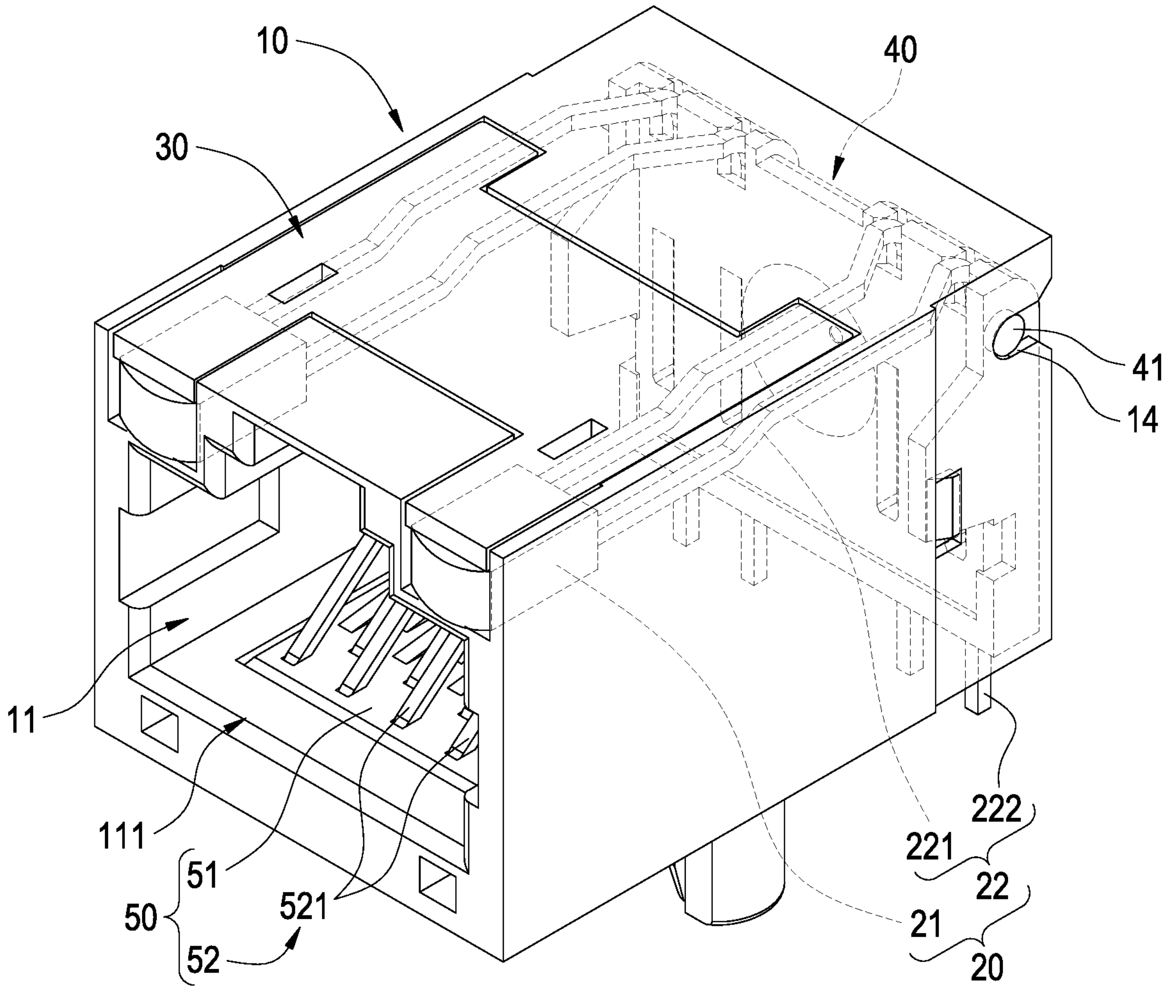
FIG. 5 is a perspective view of the present disclosure after bending.
Figure 6:
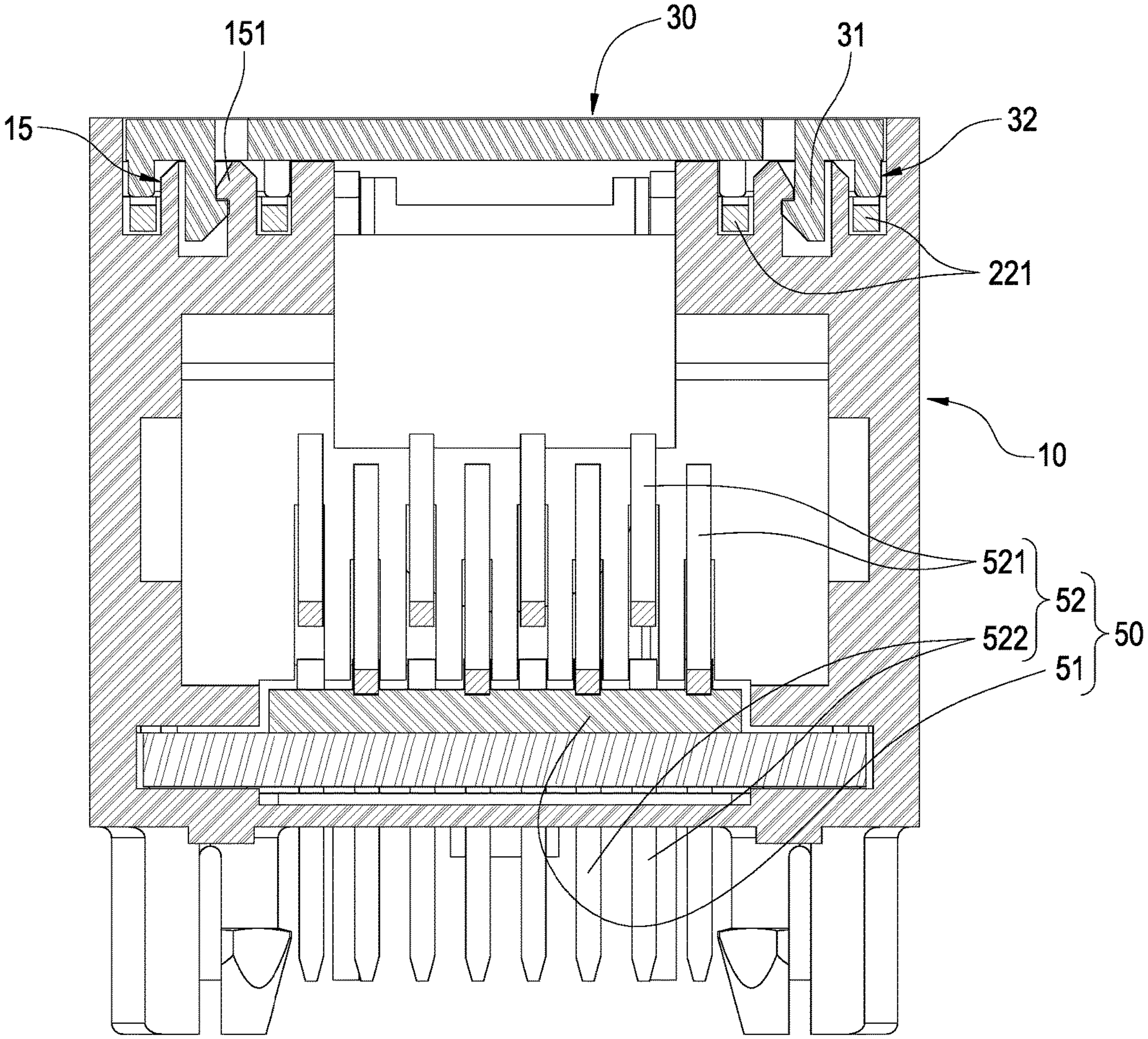
FIG. 6 is a sectional view of the present disclosure after bending.
Figure 7:
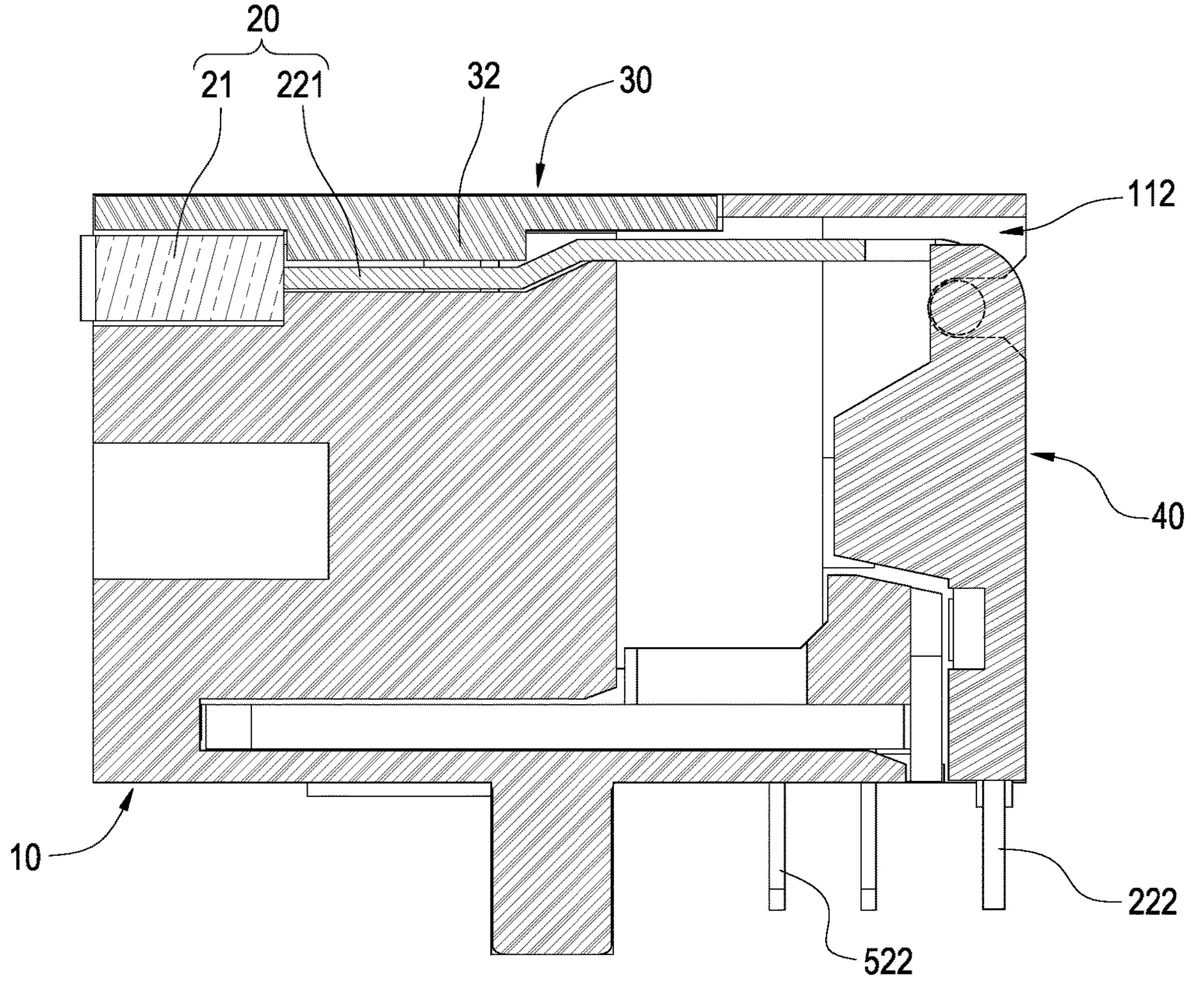
FIG. 7 is a cross-sectional view of the present disclosure after bending from another viewing angle.
Figure 8:
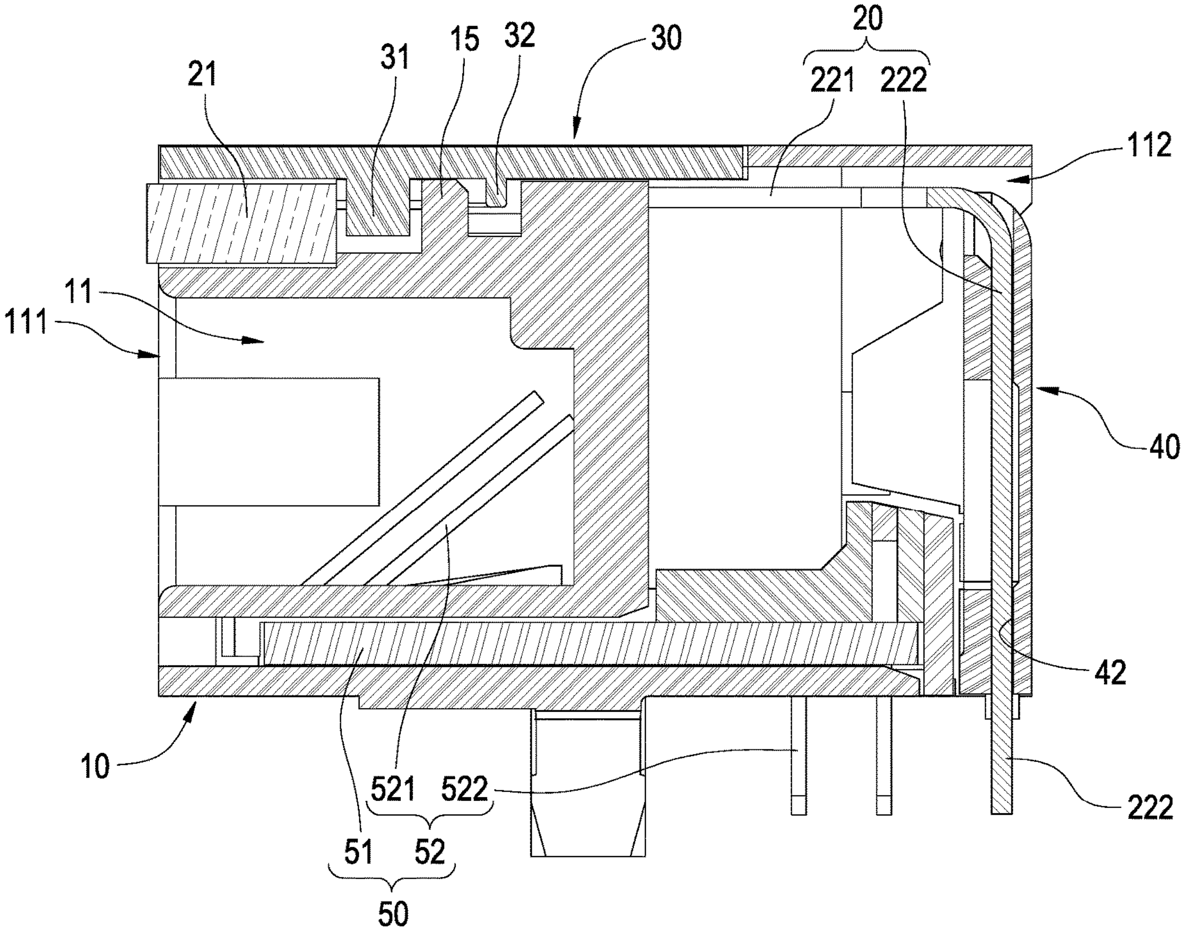
FIG. 8 is another cross-sectional view of the present disclosure.

The present disclosure provides an electrical connector structure. Referring to FIG. 1 to FIG. 8, the electrical connector structure mainly includes an insulating base 10, two light-emitting diodes (LEDs) 20, at least one top cover 30, and a back cover 40.

In the present embodiment, the insulating base 10 is formed by plastic injection molding, but the present disclosure is not limited in this regard. For example, the insulating base 10 may also be made of other insulating materials. The insulating base 10 is provided with a through slot 11 extending along a longitudinal direction, thereby forming a plug end 111 and a soldering end 112 at two ends of the through slot 11. A top surface of the insulating base 10 is provided with two engagement grooves 12 and two notches 13 arranged corresponding to the two engagement grooves 12 respectively. Specifically, the engagement grooves 12 are transversely arranged and located at a top of the plug end 111, while the notches 13 communicate with the engagement grooves 12 and located between the plug end 111 and the soldering end 112. In the present embodiment, the two notches 13 communicate with each other. The present disclosure is not limited in this regard. For example, the two notches 13 may be independently set and communicate with the engagement grooves 12 respectively.

Each light-emitting diode 20 includes a light-emitting body 21 and two conductive rods 22 longitudinally connected to one side of the light-emitting body 21. This allows the light-emitting body 21 to emit light when the conductive rods 22 are energized. Through the change of the light, users may determine a current signal transmission status of the electrical connector structure. Each light-emitting body 21 is embedded in one of the engagement grooves 12 and partially exposed from the insulating base 10. The conductive rods 22 are transversely arranged and partially accommodated in the notches 13 respectively.

In the present embodiment, the top cover 30 is integrally formed (or formed in one piece) by plastic injection molding, the present disclosure is not limited in this regard. For example, the top cover 30 may also be made of other insulating materials. The top cover 30 is connected to a top surface of the insulating base 10 corresponding to the engagement grooves 12 and the notches 13, so as to cover and press the light-emitting diodes 20. It should be noted that, after the top cover 30 in this embodiment is connected to the insulating base 10, the top cover 30 forms a coplanar surface with the top surface of the insulating base 10 without producing protrusions or depressions, so as to facilitate installation of a metal casing (not illustrated in figures) on the outside of the insulating base 10.

In the present embodiment, the back cover 40 is formed by plastic injection molding, but the present disclosure is not limited in this regard. For example, the back cover 40 may also be made of other insulating materials. The back cover 40 is pivotally connected to the insulating base 10. Specifically, the pivot shafts 41 are extended from left and right sides of the back cover 40, while the insulating base 10 is provided with pivot holes 14 arranged corresponding to the pivot shafts 41 and defined adjacent to the top surface of the insulating base 10 on left and right sides of the soldering end 112. The pivot shafts 41 are pivotally connected to the pivot holes 14 respectively, allowing the back cover 40 to pivot up and down relative to the insulating base 10, thereby opening or vertically covering the soldering end 112 of the through slot 11. Further, the back cover 40 is provided with a plurality of through holes 42, which are parallel to each other and perpendicular to an axis connecting the pivot shafts 41. Rest portions of the conductive rods 22 respectively pass through the through holes 42 in the back cover 40.

When the electrical connector structure of the present disclosure is being assembled, assembly personnel may first insert the conductive rods 22 of each light-emitting diode 20 through the respective notches 13 into the insulating base 10. The conductive rods 22 are then inserted through the through holes 42 in the back cover 40, so that the light-emitting body 21 of each light-emitting diode 20 is embedded in the corresponding engagement groove 12. The top cover 30 is then placed over the top surface of the insulating base 10 to cover and press down on each light-emitting diode 20. Finally, the back cover 40 is pivoted to cover the soldering end 112 of the through slot 11, thereby bending the conductive rods 22. As a result, the electrical connector structure of the present disclosure facilitates convenient assembly of each light-emitting diode 20 into the insulating base by the assembly personnel. Furthermore, when the conductive rods 22 are bent, each conductive rod 22 forms a horizontal section 221 accommodated in the corresponding notch 13, and a vertical section 222 bent vertically from the horizontal section 221 and inserted through the back cover 40. This allows the bent vertical sections 222 of the conductive rods 22 to be conveniently soldered to a circuit board (not illustrated in figures).

Furthermore, the electrical connector structure of the present disclosure includes a signal transmission assembly 50. The signal transmission assembly 50 is disposed in the through slot 11 of the insulating base 10 and is used to be electrically connected with a mating connector (not illustrated in figures) to transmit signals. The signal transmission assembly 50 mainly includes a terminal base 51 and a plurality of conductive terminals 52 arranged in parallel on the terminal base 51. Each conductive terminal 52 includes a mating section 521 and a soldering section 522 bent from the mating section 521. Specifically, the terminal base 51 is located in the insulating base and disposed at a bottom of the through slot 11. The mating sections 521 pass through and are extended from the terminal base 51 and accommodated in the through slot 11 to establish electrical connection with terminals of the aforementioned mating connector. The soldering sections 522 are extended outward from a bottom of the insulating base 10 in an opposite direction (to the mating sections 521) and arranged parallelly to the vertical sections 222 of the conductive rods 22 after bending, which allows the soldering sections 522 to be conveniently soldered onto the circuit board as mentioned earlier. It should be noted that the signal transmission assembly 50 is not limited to the aforementioned elements. The adjustments may be made based on different requirements, and thus, specific elements and structures of the signal transmission assembly 50 should not be used to limit the scope of the present disclosure.

Please refer to FIGS. 1, 2, and 3 and FIGS. 6, 7, and 8. The insulating base 10 is provided with two locking groove structures 15, and the top cover 30 includes two locking hooks 31. The locking hooks 31 are respectively engaged with the locking groove structures 15 to secure the top cover 30 to the insulating base 10. Specifically, each of the locking groove structures 15 is disposed on one side of a corresponding one of the engagement grooves 12 and includes a resilient hook 151 for engagement with a corresponding one of the locking hooks 31. Each of the locking groove structures 15 is disposed between the two conductive rods 22 of the corresponding light-emitting diode 20. In the present embodiment, each of the locking groove structures 15 is in a U shape, and each of the resilient hooks 151 is formed on an inner side of the U shape. When the top cover 30 is assembled to the insulating base 10, each of the locking hooks 31 is placed in the U shape and engaged with the corresponding resilient hook 151. The present disclosure is not limited to this configuration, and for example, the locking groove structures 15 may also be in the form of fastening holes.

Moreover, the top cover 30 also includes two compression structures 32. Each compression structure 32 is disposed on one side of a corresponding one of the locking hooks 31 and is used to press the conductive rods 22 of a corresponding one of the light-emitting diodes 20. Specifically, in the present embodiment, each compression structure 32 is an L-shaped block and arranged corresponding to one of the locking groove structures 15. This allows each L-shaped compression structure 32 to simultaneously press down on the conductive rods 22 on two sides of the corresponding locking groove structure 15. The specific structures of the compression structures 32 and the locking groove structures 15 may be adjusted to meet specific requirements. Consequently, when the top cover 30 is securely attached to the insulating base 10, each locking hook 31 is engaged with the corresponding locking groove structure 15 to secure the top cover 30. At the same time, the compression structures 32 abut against the horizontal sections 221 of the conductive rods 22 to fix the conductive rods 22 in place, which prevents any movement or shaking that may interfere with the bending effect when the back cover 40 pivots.

Certainly, the present disclosure may have various other embodiments without departing from the spirit and essence of the present disclosure. Skilled persons in the field can make various modifications and variations based on the present disclosure. Such modification and variations should be deemed to fall within the protection scope of the present disclosure.

What is claimed is:

1. An electrical connector structure, comprising:

an insulating base, comprising a through slot extended therein, two engagement grooves and two notches arranged corresponding to the two engagement grooves defined on a top surface thereof, the two engagement grooves located at one end of the through slot, and the notches communicate with the engagement grooves respectively;

two light-emitting diodes, each of the light-emitting diodes comprising a light-emitting body and two conductive rods connected to one side of the light-emitting body, two light-emitting bodies embedded in the engagement grooves respectively, each of the conductive rods initially comprising a horizontal section and two horizontal sections accommodated in the two notches respectively;

at least one top cover, connected to the insulating base corresponding to the two engagement grooves and the two notches to cover the two light-emitting diodes; and a back cover, pivotally connected to the insulating base and covering another end of the through slot, and comprising a plurality of through holes for receiving the horizontal section then rotate to form a vertical section of the conductive rod.

2. The electrical connector structure according to claim 1, wherein the insulating base comprises two locking groove structures, the top cover comprises two locking hooks, and each of the locking hooks is engaged with each of the locking groove structures correspondingly to fix the top cover to the insulating base.

3. The electrical connector structure according to claim 2, wherein each of the locking groove structures is substantially in a U shape and comprises a resilient hook, and each of the locking hooks is accommodated in each of the locking groove structures to be engaged with each of the resilient hooks correspondingly.

4. The electrical connector structure according to claim 2, wherein each of the locking groove structures is disposed on one side of each of the engagement grooves correspondingly, and each of the locking groove structures is disposed between the two conductive rods of each of the light-emitting diodes.

5. The electrical connector structure according to claim 4, wherein the top cover further comprises two compression structures arranged corresponding to the two locking groove structures, and each of the compression structures is substantially in an L shape and arranged around each of the locking groove structures to abut against the conductive rods of each of the light-emitting diodes correspondingly.

6. The electrical connector structure according to claim 1, wherein the top cover comprises two compression structures, and each of the compression structures abuts against the conductive rods of each of the light-emitting diodes.

7. The electrical connector structure according to claim 1, wherein the notches communicate with each other.

8. The electrical connector structure according to claim 1, wherein a pivot shaft is extended from each of two sides of the back cover, a pivot hole is defined on each of two sides of the insulating base, and the pivot shafts are pivotally connected to the pivot holes respectively.

9. The electrical connector structure according to claim 1, further comprising a signal transmission assembly, wherein the signal transmission assembly comprises a terminal base and a plurality of conductive terminals, the terminal base is disposed in the insulating base, and the conductive terminals are inserted through the terminal base.

10. The electrical connector structure according to claim 9, wherein each of the conductive terminals comprises a mating section and a soldering section bent from the mating section, the mating section passes through the terminal base and is accommodated in the through slot, and the soldering sections are extended outward from the insulating base and arranged parallelly to the vertical sections.

* * * * *